United States Patent [19]
Nakamura

[11] 3,837,419
[45] Sept. 24, 1974

[54] HYBRID ELECTRIC POWER VEHICLE

[75] Inventor: Kazumasa Nakamura, Toyota, Japan

[73] Assignee: Toyota Jidosha Kogyo Kabushiki Kaisha, Aichi-ken, Japan

[22] Filed: May 9, 1973

[21] Appl. No.: 358,512

[30] Foreign Application Priority Data
May 16, 1972 Japan............................. 47-47728

[52] U.S. Cl................. 180/65 R, 290/16, 318/139
[51] Int. Cl............................................ B60l 11/12
[58] Field of Search........... 180/65 A, 65 R; 290/14, 290/16; 318/139, 312, 332, 341, 343

[56] References Cited
UNITED STATES PATENTS

| | | | |
|---|---|---|---|
| 1,275,201 | 8/1918 | Beach............................. | 180/65 X |
| 3,515,968 | 6/1970 | Crawford........................ | 180/65 X |
| 3,630,304 | 12/1971 | Sahinkaya...................... | 318/139 |
| 3,716,767 | 2/1973 | Kuriyama et al.............. | 180/65 R X |
| 3,771,821 | 11/1973 | Rist et al........................ | 180/65 X |

Primary Examiner—David Schonberg
Assistant Examiner—David M. Mitchell
Attorney, Agent, or Firm—Toren, McGeady and Stanger

[57] ABSTRACT

In the hybrid electric power vehicle disclosed, a generator driven by a heat engine turns a motor which moves the vehicle. A main circuit controls the motor with power from the generator. The main circuit includes a first thyristor or relay contact for connecting the main circuit and the battery in series with each other or in parallel with each other and a commutation circuit that operates as a chopper. A second thyristor provides the energy from the generator to the motor in the form of pulses. A switch-over circuit opens the relay contact on the basis of the relationship between the degree to which the accelerator pedal is depressed and the motor speed so as to connect the main battery and the generator in series. An output ratio control circuit turns the two thyristors on so that the generator and main battery outputs are supplied to the motor together. The output of the battery is varied by the first thyristor in response to the degree to which the accelerator pedal is depressed.

12 Claims, 18 Drawing Figures

HYBRID ELECTRIC POWER VEHICLE

BACKGROUND OF THE INVENTION

This invention relates to electrically powered vehicles, and particularly to hybrid electric power vehicles wherein a generator is driven by a heat engine and a main battery charged by the generator so that the battery can operate a motor which drives the vehicle.

Direct current series motors commonly used for hybrid types of electrically powered vehicles have their counter electromotive force controlled by the motor speed and field current of the motor. As the motor speed increases, such motors become less and less capable of efficiently utilizing all the electric power available from this power source at voltages lower than a predetermined level. For this reason, the voltage of the power source is set high enough to permit high motor speeds.

Such operation of the motor is not desirable because the choppers which control the motor supply voltage at low speeds become less efficient. To eliminate this disadvantage, means have been considered for permitting changes in the connection between the generator and the main battery from parallel to series or vice versa. Thus, the generator and battery may be connected in parallel for slow motor speeds and in series for high motor speeds. However, when the generator and battery are connected in series their currents are limited to the same value and are supplied to the motor without proper selection. Thus, the total power which both of them can supply cannot be applied to the motor due to the imbalance in the output ratio. Moreover, the drain on the main battery is substantially increased.

An object of this invention is to improve such hybrid type electric power sources for motor vehicles.

Another object of the invention is to improve vehicles of this type.

Still another object of this invention is to avoid the aforementioned difficulties.

SUMMARY OF THE INVENTION

According to a feature of the invention, these objects are attained, in whole or in part, by connecting the generator and the main battery in series with each other during high speeds in such a manner that the main battery only supplements the power the generator is capable of delivering, and by varying the time during which power is supplied by the generator alone and the time during which power is supplied jointly by the generator and the battery in response to the driving conditions of the vehicle.

These features improve the driving performance of a vehicle and allows it to operate at high efficiency with minimum battery discharge.

These and other features of the invention are pointed out in the claims. Other objects and advantages of the invention will become evident from the following detailed description when read in light of the accompanying drawings.

BRIEF DESCRIPTION OF THE DRAWINGS

In the drawings:

FIGS. 8a through 8h are voltage-time diagrams illustrating the voltages appearing at the various points in the circuit of FIGS. 1 to 3 when the generator and battery are connected in series.

DESCRIPTION OF PREFERRED EMBODIMENTS

Figure 1:
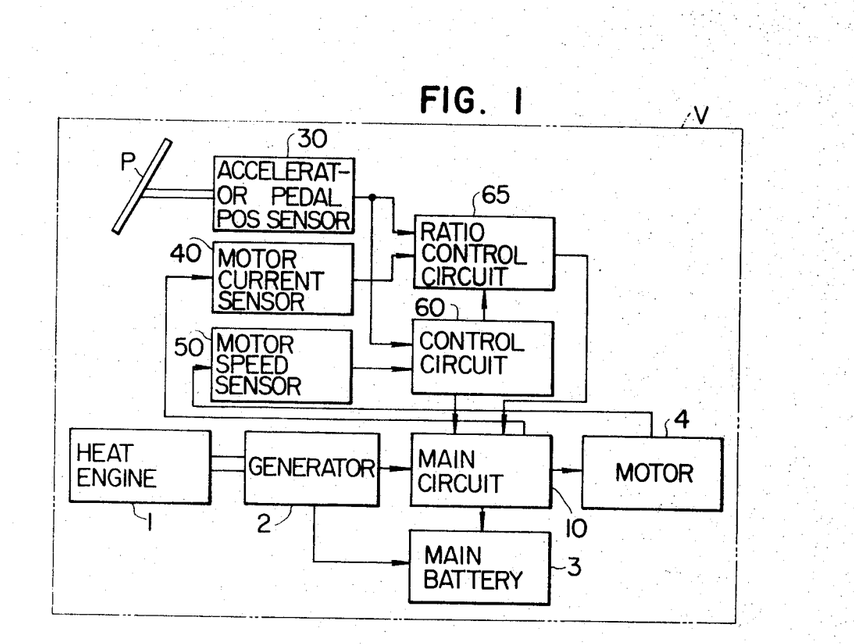
FIG. 1 is a block diagram illustrating a hybrid type of electric power vehicle embodying features of the invention.

In FIG. 1, a hybrid electric power vehicle V embodying this invention includes a heat engine 1 which drives a generator 2. According to one embodiment of the invention, the generator 2 is a DC generator. According to another embodiment of the invention, the generator 2 is an AC generator having a rectifier system. A main battery 3 receives a charge from the generator 2 and a DC series motor 4 moves the vehicle. A main circuit 10 controls the motor 4 with power from the generator 2 and the main battery 3. An accelerator-pedal position sensor 30 detects the position of an accelerator pedal P to determine the amount that the pedal is depressed.

A motor current sensor 40 detects the motor-operating current delivered by the main circuit 10 to the motor 4. A motor speed sensor 50 detects the rotary speed of the motor. A switch-over control circuit 60 connects the generator 2 either in parallel or in series with the main battery 3 in response to the operating state of the vehicle determined by the relation between the amount which the accelerator pedal P is depressed and the speed of the motor 4. A power distribution control circuit 65 sets the power distribution in response to the motor current and accelerator pedal depression, particularly when the generator 2 and main battery 3 are connected in series.

Figure 2:
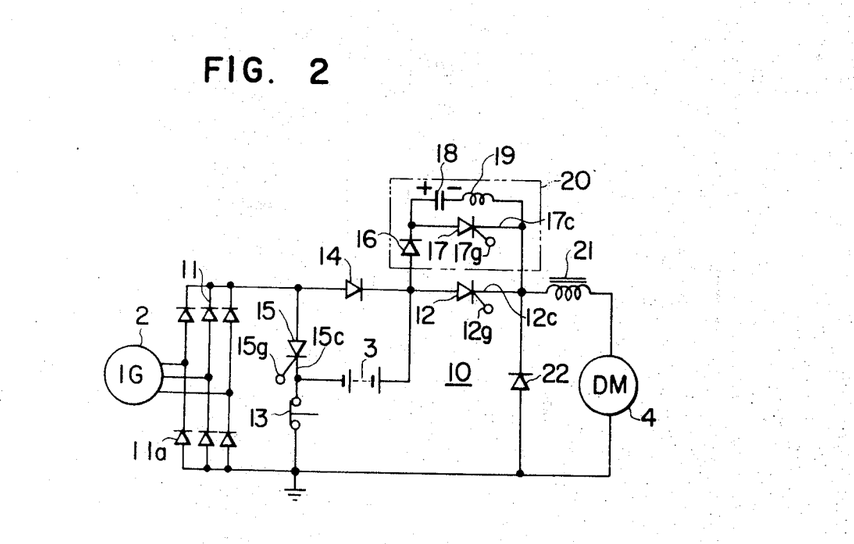
FIG. 2 is a circuit diagram illustrating details of a power system in the vehicle of FIG. 1.

FIG. 2 illustrates the relationship between circuit 10, the battery 3, and the motor 4. In FIG. 2, the generator 2 is embodied as a three-phase generator with a three-phase rectifier 11 using diodes 11A. For simplicity, the reference numeral 2 in FIG. 2 identifies the generator alone without the rectifier 11.

The output of the AC generator 2 energizes the motor 4 through the rectifier 11 composed of diodes 11A. The normally closed relay contact 13 and a diode 14 connects the main battery 3 in parallel with the rectifier 11, when a thyristor 15 is non-conductive. Thus, the main battery 3 is effectively connected parallel to the generator 2 (either including or excluding the rectifier 11) by rendering the thyristor 15 non-conductive and closing the contact 13. The main battery 3 is effectively connected in series with the generator 2 by turning on the thyristor 15 and making it conductive and opening the contact 13.

In the main circuit 10, a thyristor 12 controls the motor 4. The latter is connected in parallel with a commutation circuit 20 composed of a diode 16, a thyristor 17 for turning off the thyristor 12, a capacitor 18, and a coil 19. A reactor 21 and a flywheel diode 22 smooths the operating current of the motor 4 when the battery and generator are connected in series as well as in parallel. Control means (not shown) control the generator 2 to produce a constant voltage high enough to charge the main battery 3. The three thyristors 12, 15, and 17 are rendered conductive only after being triggered with trigger signals applied between the gates and cathodes 12g and 12c, 15g and 15c, and 17g and 17c. The commutation circuit 20 serves to turn off the conducting thyristor 12. When the thyristor 17 is triggered to become conductive, it makes the capacitor 18, which has been charged as shown in FIG. 2, discharge so that current flows from the capacitor 18 through the conductive thyristor 17. Owing to the inductance of the coil 19, the capacitor 18 takes the reverse polarity when the above current has decreased to zero. The capacitor 18, which is now charged in the reverse polarity, urges current to flow through the thyristor 12 in the reverse direction so that the thyristor 12 is turned off. After turning off the thyristor 12, the capacitor 18 is charged again by the battery 3. This chopper operation produces pulsating power which is supplied to the motor 4.

With this arrangement, the connection between the generator 2 and the battery 3 is changed from parallel to series and back. In the parallel connection, constant voltage is supplied intermittently to the motor 4. The voltages are determined by the generator 2 and the main battery 4 and the thyristors 12 and 17 turned on in that order. A control system to be described periodically fixes the time for turning on the thyristor 17. The time at which the thyristor 12 or power supply is turned on varies, depending upon the operating state of the vehicle.

When the generator 2 and battery 3 are connected in series, the generator output only is supplied to the motor 4 by turning on the thyristor 12 with the three thyristors 12, 15, and 17 turned on in that order. After turning on the thyristor 15, the main battery output is added. A control system to be described periodically fixes the time for turning on the thyristors 12 and 17. The time when the thyristor 15 is turned on, and hence the ratio of battery output to generator output, is determined on the basis of the operating condition of the vehicle.

Figure 3:
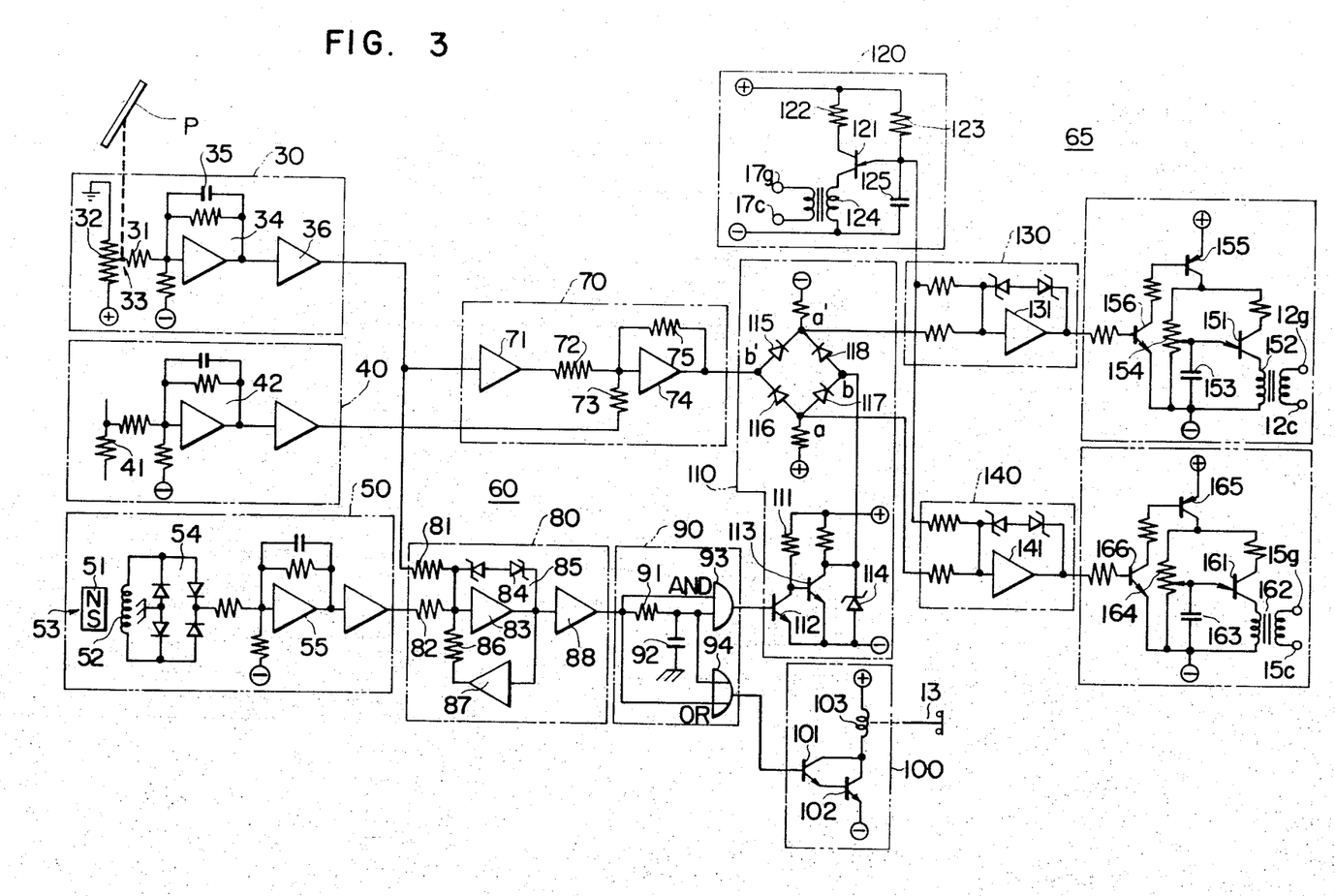
FIG. 3 is a circuit diagram illustrating the control system for the circuit of FIG. 2.

The aforementioned control system which operates the three thyristors 12, 15, and 17, and the relay contact 13 is illustrated in FIG. 3. Here, the pedal P, when moved, moves a variable contact 31 along a resistance member 32 in a variable resistor 33 in the accelerator pedal detector 30. A voltage is connected across the resistor 32, one end of which is grounded. Included in the detector 30 is an adder 34 composed of a resistance and an operational amplifier connected to the contactor 31 and an input connected to the negative terminal of the DC source. A capacitor 35 connected parallel to the adder 34 removes noise. An inverting amplifier 36 provides the output from the pedal position detector.

Figure 4:
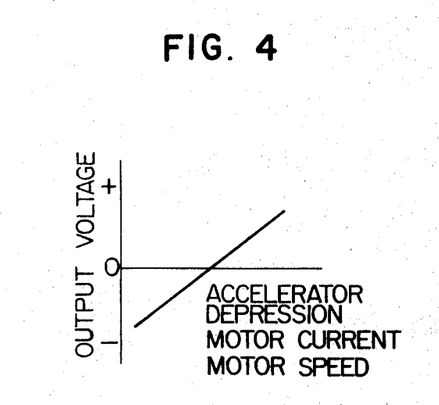
FIG. 4 is a graph illustrating the characteristic curve of detectors used in connection with the circuits and systems disclosed in FIGS. 1 to 3.

The variable resistance 33 varies in response to the degree of depression of the accelerator pedal P. A positive voltage proportional to the resistance and a negative voltage from the constant DC voltage source are added. Thus, the positive and negative voltages are produced in proportion to the amount that the pedal is depressed as shown in FIG. 4.

The current detector 40 includes the shunt resistor 41 located at a measuring point between the generator 2 and the motor 4 in the main circuit 10 and an operational amplifier 42 arranged similar to the operational amplifier in the pedal position detector 30. As shown in FIG. 4, positive and negative voltages are produced in proportion to the motor current.

In the motor revolution detector 50, an AC generator 53 is composed of a permanent magnet 51 mechanically coupled to the rotor of the motor 4 and a stator winding 52 to detect the magnetic flux interlinked with the rotor. A four-way rectifier 54 converts the output voltage of the stator winding 52 from AC to DC. An operational amplifier 55 arranged similar to the one in the accelerator pedal position detector 30 produces the output signal of the motor revolution detector 50. With such an arrangement, the AC voltage induced in the stator winding 52, which is proportional to the rotary speed of the magnet 51 and the motor 4, is converted into direct current by the full wave rectifier 54 and the current is then supplied to the operational amplifier 55. Thus, as shown in FIG. 4, positive and negative voltages are produced in proportion to the motor speed.

The switch-over control circuit 60 is generally composed of a running state check circuit 80, a switch-over sequence circuit 90 and a relay contact operating circuit 100. In the running state check circuit 80, a resistor 81 connected to the pedal position detector 30 and a resistance 82 connected to the motor revolution detector 50 supply the pedal position detector and motor revolution detector output signals to a comparator 85 composed of an operational amplifier 83 and Zener diodes 84. A resistor 86 and an inverting amplifier 87 form a feedback loop to prevent hunting in the comparator 85. Another inverting amplifier 88 forms an output for the check circuit 80.

Figure 5:
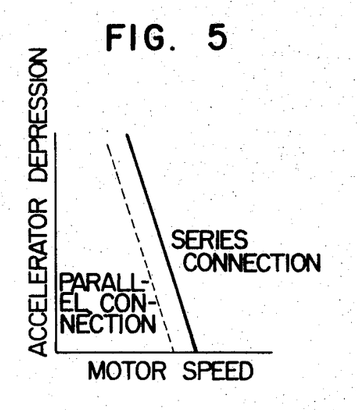
FIG. 5 is a diagram illustrating the switch-over patterns for the circuits in FIGS. 1 to 3.

In the check circuit 80, signals indicating motor speed and the amount of accelerator pedal depression are compared in order to check the operating state on the basis of change-over pattern predetermined by various dimensions in the individual sections as shown in FIG. 5. More specifically, in such an arrangement, signals responding to motor revolutions and to the depression amount of the accelerator pedal are applied as inputs for checking the running state by comparison with change-over patterns predetermined by various dimensions in individual sections from their relation, as shown in FIG. 5.

Positive output signals are produced only when the series connection is required for high speed drive.

Figure 6A:
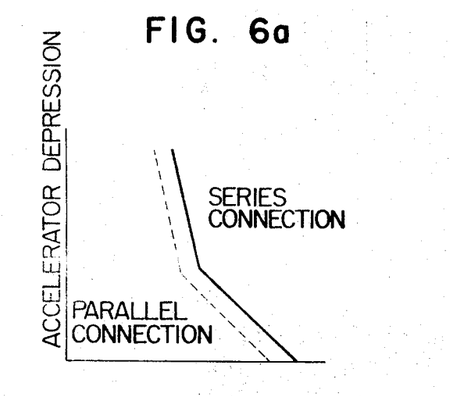
FIG. 6a is a diagram illustrating the switch-over characteristics of the circuit of FIG. 6b.

In the embodiment of FIG. 5, change-over points are indicated on a single slope. In the operation of a running state check circuit 80' as shown in FIG. 6(a), composed of two check circuits 81' and 82' having different change-over patterns and NAND gate 83' to carry out logic operations for two outputs, it is possible to change the slope of the switch-over or change-over points.

Figure 6B:
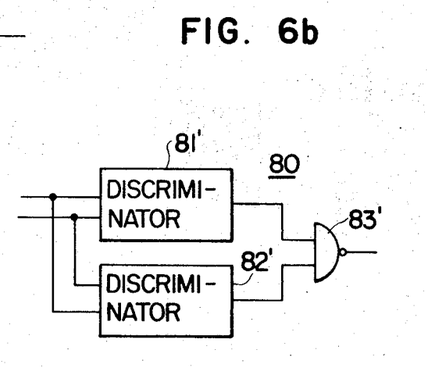
FIG. 6b is a block diagram of a circuit usable in the arrangement of FIGS. 1 to 3 for producing another switch-over characteristic.

In FIG. 5 and FIG. 6 (b), solid lines indicate switch-over points from parallel to series connection while the broken lines from series to parallel connection.

The switch-over or change-over sequence circuit 90 includes an AND gate 93 and an OR gate 94 connected directly, or indirectly through a capacitor, to the running state check circuit 80. When the check circuit 80 supplies positive signals, a positive output appears at the OR gate 94 earlier then they appear at the AND gate 93. The time difference is determined by the time required to charge the capacitor 92. However, negative signals appearing at the output of the circuit 80 causes a zero to appear immediately at the output of the AND gate 93, while a zero does not appear at the output of the OR gate 94 until the capacitor 92 has had a chance to discharge.

In the relay contact operating circuit, a transistor 101 receives signals from the OR gate 94 at its base. Transistor 102 having its base and collector connected to the emitter and collector of the transistor 101, and its collector to an exciting coil 103, actuates a normally closed relay contact between the collector of the transistor 102 and the positive terminal of the constant voltage source. When output signals are supplied from the OR gate 94, the transistors 101 and 102 are rendered conductive so as to excite the coil 103 and open the relay contact 13.

When the vehicle travels at a low speed corresponding to a point, determined by the amount that the accelerator pedal P is depressed and by the motor speed, located in the characteristic of FIG. 5 to the left of the solid and broken lines, the accelerator pedal position detector 30, the motor speed detector 50, and the control circuit 60 leaves the relay contact 13 in its normally closed position and connects the main battery 3 and the generator 2 in parallel with each other. By contrast, when the vehicle travels at high speed corresponding to a point located to the right of the solid or broken line in FIG. 5, the relay contact 13 is opened. This releases the main battery 3 from its parallel connection with the generator 2. The battery 3 is then connected in series with the generator 2.

The function of controlling the allotment of power required by the motor to the battery and the generator is performed by a ratio control circuit 65. The latter is composed of an operational circuit 70, the trigger switch-over circuit 110, a reference generator 120, pulse width modulators 130 and 140, and trigger generators 150 and 160.

The operational circuit 70 produces an output representing the difference between the amount the accelerator is depressed and the motor current. This is accomplished by applying the output of the motor current sensor 40 to an operational amplifier composed of input resistors 72 and 73, base amplifier 74, and feedback resistor 75. An inverting amplifier 71 applies the output of the pedal position detector 30 to the input resistor 72. Since the inverting amplifier has inverted the polarity of the pedal position detector, and the two input voltages are added by the input resistors 72 and 73, the output of the operational circuit 70 represents the difference between the amount the accelerator pedal P has been depressed and the motor current.

In the trigger switch-over circuit 110, the base of a transistor 112 is connected to the AND gate in the sequence circuit 90. A collector-resistor 111 energizes the collector of transistor 112 from the positive terminal of a constant voltage source whose negative terminal energizes the emitter. Cascade-connected with the transistor 112 is a transistor 113 whose base is connected to the collector of transistor 12 and whose collector and emitter are energized from the terminals of the constant voltage source in the same manner as the transistor 112. A Zener diode 114 shunts the collector-emitter path of transistor 113. Four diodes 115, 116, 117, and 118 form a bridge circuit between two resistors that connect the bridge circuit to the terminals of the constant voltage source. The source feeds a small current from an output terminal $a$ to an output terminal $a'$ through two input terminals $b$ and $b'$. The operational circuit 70 supplies the input to the input terminal $b'$ while the transistor 112 supplies the voltage to the input terminal $b$.

In the circuit 110, when positive-going signals are supplied by the AND gate 93 of the circuit 90, the transistor 112 is rendered conductive and the transistor 113 is turned off. Consequently, a positive voltage, stabilized by the Zener diode 114, is supplied to the input terminal $b$. When the transistor 112 is rendered nonconductive by a low signal or the lack of a signal at the output of AND gate 93, the input terminal $b$ becomes negative. The voltages are arranged so that the positive voltage at the input terminal $b$ is higher than the voltage at the terminal $b'$ from the operational circuit.

In view of the above, with a series connection, signals from the AND gate 93 cause the diodes 118 and 116 to become conductive. Thus, the voltage at the input terminal $b$ appears at the output terminal $a'$ while the voltage at the input terminal $b'$ appears at the output terminal $a$. On the other hand, during parallel connection, without signals from AND gate 93, the diodes 115 and 117 are rendered conductive. The voltage of the input terminal $b'$ then appears at the output terminal $a'$, while a negative voltage appears at the output terminal $a$.

The voltages at the outputs $a$ and $a'$ are used in pulse width modulators 130 and 140 together with the sawtooth output of a reference generator 120.

In the reference generator 120, a unijunction transistor 121 has its first base and emitter connected to the positive terminal of the constant voltage source through resistances 122 and 123. A pulse transformer 124 connects the second base to the negative terminal of the source while a capacitor 125 is connected between the emitter and the negative terminal. The secondary of the pulse transformer 124 includes output leads 17c and 17g which provide output pulses between the cathode and gate 17g of the thyristor 17. The lead 17g is connected to the gate and the lead 17c to the cathode. In operation, the capacitor 125 charges through the resistor 123 and applies its voltage to the emitter of the unijunction transistor 121. When the voltage across the capacitor 125 reaches the peak point, the unijunction transistor 121 is rendered conductive. This rapidly discharges the capacitor 125 and reduces the emitter voltage. It also turns off the unijunction transistor 121. The capacitor 125 then again charges at a rate determined by the resistance of resistor 123 and capacitance of 125 until the peak point of the transistor 121 is reached again. The capacitor then again discharges and turns off the unijunction transistor 121. With each discharge of the capacitor 125 through the conducting unijunction transistor 121, the transformer 124 applies a trigger to its secondary winding.

The voltage at the emitter of the unijunction transistor 121 represents a sawtooth.

The two pulse width modulators 130 and 140 receive the sawtooth waveform from the reference generator 120 at one of their respective pair of terminals. In the pulse width modulators, comparators 131 and 141 operate similarly to the running state check circuit 80. As stated, one input of each is connected to the emitter of the unijunction transistor 121 and the reference generator 120. The other input of the pulse width modulator 130 receives its signal from the output terminal $a'$ of circuit 110. The other input of the pulse width modulator 140 receives its signal from the output terminal $a$ of the circuit 110.

Each of the pulse width modulators 130 and 140 produces negative or positive signals whose polarity is the reverse of the polarity of the sum of the signal from the circuit 110 and the sawtooth waveform at the emitter of unijunction transmitter 121. In the condition that a positive voltage appears at the output terminal $b$ and is applied to the first pulse width modulator 130, when the sawtooth wave signals are changed from positive to negative, this changes the output signals quickly from positive to negative. When a voltage is applied to the input terminal $b'$, the output signals are changed from positive to negative more quickly with higher voltages and more slowly with lower voltages. This produces square wave pulses.

On the other hand, voltages at the input terminal $b'$ and the negative voltage appearing at the output terminal $a$ in the circuit 110 are applied to the second pulse width modulator 140. In the former case, the output signals are changed from positive to negative more quickly with higher voltages and more slowly with lower voltages as in the first pulse width modulator. In the latter case, the output signals are kept positive as a result of the sum of two inputs which are made negative at all times. Since the positive voltage at the input terminal $b$ to be applied to the first pulse width modulator 130 is kept unchanged, the timing for switching over the output signals from positive to negative is fixed after the fall of the sawtooth wave.

The trigger generators 150 and 160 have unijunction transistors 151 and 161 similar to the reference generator 120. Pulse transformers 152 and 162 form an output along secondary leads 12g, 12c, 15g, and 15c. Capacitors 153 and 163 are charged at the taps of variable resistors 154 and 164 which receive current when transistors 155 and 165 conduct. The transistors 155 and 165 also supply current from the constant voltage source to one of the bases of each of the unijunction transistors 151 and 161. The emitters of transistors 155 and 165 are connected to the positive terminal of the constant voltage source while the collectors are connected to the first bases of the unijunction transistors 151 and 161. Input transistors 156 and 166 operate the transistors 155 and 165. The collector-emitter path of each of the transistors 156 and 166 receives its current through the emitter base junctions of the transistors 155 and 165. The transistors 156 and 166 respond to the outputs of the pulse width modulators 130 and 140.

When the output from the first pulse width modulator 130 is positive, the biasing voltages in the trigger generator 150 turns the transistors 156 and 155 conductive. This charges the capacitor 153 through the variable resistance 154. The latter is adjusted so that the charging voltage across the capacitor will not turn the unijunction transistor 151 conductive. When the input signal at the base of the transistor 156 is changed from positive to negative, the transistors 155 and 156 are rendered non-conductive. This causes the second base voltage of the unijunction transistor 151 to drop sharply. The peak point voltage then becomes equal to the voltage charge across the capacitor 153 and turns on the transistor 151. The capacitor 153 discharges and produces trigger signals in the pulse transformer 152. Two output leads 12g and 12c of the pulse transformer 152 apply the triggers to the cathode 12c and gate 12g of the thyristor 12.

The trigger 160 operates similarly and supplies trigger signals from leads 15g and 15c to the gate 15g and cathode 15c of the thyristor 15 at each positive to negative transition of the pulse width generator 140. No trigger signals are produced during the positive state of the output signals from the pulse width modulator 140.

The operation may be best appreciated from FIGS. 7a through 8h. The sawtooth waveform at the emitter of unijunction transistor 121 in the reference oscillator 120 appear as the curve X in FIG. 7a. The trigger signals at the secondary of transformer 124 occur during each voltage decline of the waveform X and are shown in FIG. 7b as they appear at the gate of thyristor 17. Thus, when the vehicle operates at low speed, and negative signals are produced in the running state check circuit 80 which indicates the relation of the amount that the accelerator pedal P is depressed with the motor speed, and when the negative voltage applied from the terminal $a$ in the circuit 110 to the second pulse width modulator 140 is indicated by Y, the thyristor 15 is rendered non-conductive so as to connect the main battery 3 in parallel to the generator 2. This involves the relay contact 13 being in its normally closed position. It occurs because the absolute value of Y is larger than the voltage level of the sawtooth waves as shown by the lines −Y in FIG. 7a. Thus, X+Y cannot be positive, and trigger signals are not applied for second trigger generator 160 to the thyristor 15.

Figures 7A, 7B, 7C, 7D:
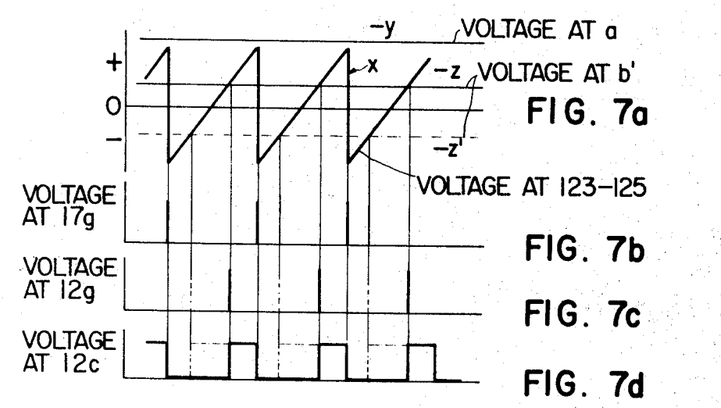
FIGS. 7a to 7d are time voltage graphs illustrating conditions of various points in the circuits of FIGS. 1 to 3 when the generator and the battery are connected in parallel.

In this case, assuming signals from the operational circuit 70 to be Z, −Z is within the voltage level shown in FIG. 7a and X+Y becomes positive at a point where they cross. Output signals from the first pulse width modulator 130 are switched over from positive to negative, and trigger signals as indicated in FIG. 7c are produced so as to turn on the thyristor 12. The voltage thus applied to the motor by the thyristor 12 has the pulse waveform shown in FIG. 7d. The on time of the motor lasts from the time the thyristor 12 is turned on to the time the thyristor 17 is turned on. That is to say, voltage thus applied to the motor turns off the thyristor 12 is then transformed into pulse waveforms having ON time equal to the period from turning on the thyristor 12 to turning on the thyristor 17 as indicated in FIG. 7d.

When the speed is increased by depressing the accelerator pedal further, signals from the operational circuit 70 have a value Z' larger than Z. The first trigger generator 150 produces signals earlier with the value −Z' as shown in FIG. 7a. The thyristor 12 is thus turned on earlier as indicated by the broken line in FIG. 7d. This makes the time during which the motor is on longer and the power is increased.

Figures 8A, 8B, 8C, 8E, 8F, 8G, 8H:
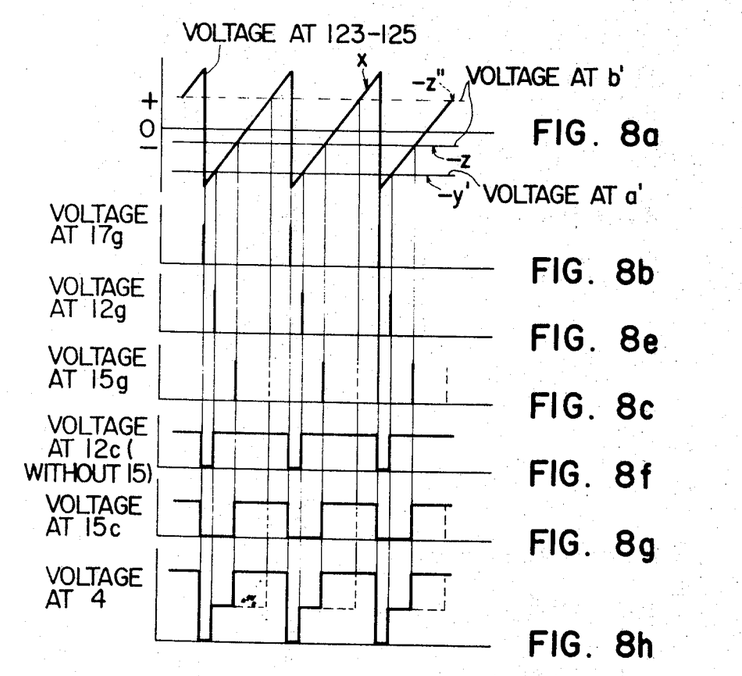

When the vehicle runs at high speed, and the circuit 80 produces positive signals on the basis of the degree to which the accelerator pedal is depressed and the motor speed, the relay contact 13 opens as follows. Sawtooth waves X are generated as indicated in FIG. 8a as mentioned before. This produces trigger signals at the gate of the thyristor 17 as indicated in FIG. 8b. If a positive voltage Y' is applied from the outside terminal a' in the circuit 110 to the first pulse width modulator 130, the value −Y' is within the voltage level of the sawtooth waves as indicated in FIG. 8a. The value X+Y becomes positive where they cross. Thus, output signals from the first pulse width modulator 130 change from a positive level to a more negative level so as to produce the trigger signals indicated in FIG. 8e and turn on the thyristor 12. Thus, current applied to the motor 4 is on from the time the thyristor 12 is turned on to the time the thyristor 17 is turned on as indicated in FIG. 8f. The current has a value determined by the generator.

At the same time, signals from the operational circuits 70 reach the second pulse width modulator 140 and trigger signals are produced as indicated in FIG. 8c. These signals turn on the thyristor 15. In this manner, the main battery 3 is connected in series with the generator 2. Current having a value determined by the main battery, is fed to the motor 4 from the time the thyristor 15 is turned on to the time the thyristor 17 is turned on. Consequently, a voltage which is the sum of the main battery 3 and the generator 2, is applied to the motor 4 as indicated in FIG. 8h. Thus, when the speed is decreased and the response to a decrease in the extent to which the accelerator pedal P is depressed, signals Z'' from the operational circuit 70 appear in FIG. 8a as indicated by −Z''. The time for turning on the thyristor 15 is delayed to that shown by the broken line. This results in a reduction of the output voltage for the main battery 3. When the sequence circuit 90 changes the battery 3 and the generator 2 from the parallel to series connection, the relay contact 13 is opened before trigger signals are produced. Conversely, when the change is from series to parallel connection, the relay contact is closed after turning the thyristor 15 non-conductive.

As described above, and in accordance with the hybrid electric wheels of the suspension, the generator and the battery are connected in series so that the output from the main battery may alleviate the shortage of the generator output according to their output ratio when the vehicle is running at high speed. As a result, the discharge from the main battery can be greatly reduced from that of the simple series connection under the same driving conditions. The continuous driving distance is extended in series connection. Battery life is prolonged. The overall thermal efficiency of the driving system, including the heat engine, is improved. Moreover, the state of series connection time for signle power supply by the generator 2, and the time for the joint power supply by the generator 2 and the main battery 3, can be varied automatically. This is done in dependence upon the operating condition of the vehicle, the amount that the accelerator pedal P is depressed, and the motor current.

According to another embodiment of the invention, the DC series motor may be replaced by a thyristor motor, a transistor motor, or a combination of an AC motor and a frequency converter. Transistors may be substituted for the thyristors.

While embodiments of the invention have been described in detail, it will be obvious to those skilled in the art that the invention may be otherwise embodied.

What is claimed is:

1. A hybrid type electric power drive apparatus for a vehicle having an accelerator pedal, comprising a heat engine, a generator driven by said heat engine, a main battery, coupling means between said battery and said generator for connecting said battery and said generator in parallel so that said generator charges said battery and for connecting said generator and said battery in series, main circuit means for controlling the power from said battery and said generator, a DC motor for driving the vehicle with power from said main circuit means, detecting means for detecting the degree to which the accelerator pedal is depressed and for detecting the current supplied to the motor as well as the speed of the motor, ratio control circuit means coupled to said detecting means and responsive to the relation between the degree of depression of the accelerator pedal and the motor speed and coupled to said coupling means and said main circuit means for causing said main circuit means and said coupling means to establish a ratio between the generator and battery output in response to the relationship between the degree of depression of the accelerator pedal and the motor speed.

2. An apparatus as in claim 1, wherein said ratio control circuit means further includes an operational circuit for producing signals in response to the difference between the degree of depression of the accelerator pedal and the motor current, a reference generator for producing signals to interrupt said main circuit at a fixed time, a first signal generator for generating signals for rendering said main circuit conductive for a fixed period when predetermined conditions are satisfied in the relationship between the degree of depression of the accelerator pedal and the motor speed, a second signal generator for generating signals so as to operate said coupling means in response to signal values from said operational circuit so that the final output may be supplied with a battery output to supplement the output of the generator.

3. An apparatus for powering an electric vehicle, comprising generator driving means, generator means responsive to said generator driving means for producing an electric current, battery means, motor means for rotating in response to current applied thereto, and control means for producing a speed demand indication; signal means responsive to combinations of the speed of said motor means, the current of said motor means, and the output of the control means for producing combination signals which define a high speed range and a low speed range, and switch means responsive to said signal means for connecting said generator means in parallel with said battery means when the signals of said signal means define a low range and for disconnecting said generator means from said battery means and then intermittently connecting the said battery means in series with said generator means when the signals define a high range.

4. An apparatus as in claim 3, wherein said switch means intermittently connects the battery means in series with the generator means for time periods depending upon the magnitude of the signals within the high speed range.

5. An apparatus as in claim 3, wherein said generator means includes a first pair of terminals and said battery means includes a second pair of terminals, said switch means including a pair of series connected switches connected between one pair of terminals and forming a common junction, one of the terminals of the other pair of terminals being connected to the common junction, said switch means including a diode connecting the second terminal of said other pair of terminals to one of the terminals of the one pair of terminals, said switches being operated by said signal means so that only one or the other is closed at one time.

6. An apparatus as in claim 3, wherein said generator means includes a pair of generator terminals and said battery means includes a pair of battery terminals, said switch means including pair of switches connected in series with each other and between said generator terminals and forming a common junction, said switch means further including a diode connecting one generator terminal to one battery terminal, the other battery terminal being connected to the common junction, said signal means closing said switches only one at a time.

7. An apparatus as in claim 6, wherein said signal means operates said switches so that the switch between the diode and the battery means is on for time periods depending upon the magnitude of the signals within lhe high-speed range.

8. An apparatus as in claim 3, wherein regulating means control the current flow from said generator means to said motor means, said signal means further including an operational circuit for producing signals in response to the difference between the speed demand indicated by said control means and current to the motor, a reference generator coupled to said regulating means for producing signals to cause said control means to interrupt current flow to the motor at a fixed time, a first signal generator for generating signals for rendering the regulating means so that it conducts current for a fixed period when predetermined conditions are satisfied in the relationship between the speed demand of said control means and the motor speed, a second signal generator for generating signals so as to operate said switch means in response to signal values from said operational circuit so that the switches connect the battery means and the generator means in series with each other.

9. An apparatus as in claim 8, wherein said generator means includes a first pair of terminals and said battery means includes a second pair of terminals, said switch means including a pair of series connected switches connected between one pair of terminals and forming a common junction, one of the terminals of the other pair of terminals being connected to the common junction, said switching means including a diode connecting the second terminal of said other pair of terminals to one of the terminals of the one pair of terminals, said switches being operated by said signal means so that only one or the other is closed at one time.

10. An apparatus as in claim 8, wherein said generator means includes a pair of generator terminals and said battery means includes a pair of battery terminals, said switch means including a pair of switches connected in series with each other and between said generator terminals and forming a common junction, said switch means further including a diode connection one generator terminal to one battery terminal, the other battery terminal being connected to the common junction, said signal means closing said switches only one at a time.

11. An apparatus as in claim 3, wherein regulating means control the flow of current between said generator means and battery means and said motor means; said signal means including a a saw tooth signal generator, signal applying means coupled to said signal generator and said control means for causing said regulating means to cut off current flow to said motor means at a predetermined point in each cycle of the saw tooth generator, first comparator means responsive on the one hand to the output of the control means and the speed of the motor means and on the other hand the voltage of said saw tooth generator for producing an electrical indication which causes the regulating means to turn on the motor current, and second comparator means responsive on the one hand to the relationship between the speed of the motor means and the control means and on the other hand to the voltage of said saw tooth generator for producing a second electrical indication which causes said switch means to place said generator means and said battery means in series with each other.

12. An apparatus as in claim 11, wherein said generator means includes a pair of generator terminals and said battery means includes a pair of battery terminals, said switch means including a pair of switches connected in series with each other and between said generator terminals and forming a common junction, said switch means further including a diode connecting one generator terminal to one battery terminal, the other battery terminal being connected to the common junction, said signal means closing said switches only one at a time.

* * * * *